United States Patent [19]
Livingston

[11] Patent Number: 5,154,018
[45] Date of Patent: Oct. 13, 1992

[54] METHOD AND APPARATUS FOR KILLING FIRE ANTS

[75] Inventor: Arnold M. Livingston, Millington, N.J.

[73] Assignee: Tifa Ltd., Millington, N.J.

[21] Appl. No.: 829,448

[22] Filed: Feb. 3, 1992

Related U.S. Application Data

[63] Continuation-in-part of Ser. No. 678,499, Apr. 2, 1991, abandoned.

[51] Int. Cl.$^5$ ............................................. A01M 13/00
[52] U.S. Cl. ...................................... 43/125; 43/132.1
[58] Field of Search ...................... 43/132.1, 124, 125, 43/127, 129, 130; 47/1.7, 2; 239/136, 288

[56] References Cited

U.S. PATENT DOCUMENTS

| | | | |
|---|---|---|---|
| 2,402,402 | 6/1946 | Hickman | 43/129 |
| 2,745,210 | 5/1956 | Hild | 43/125 |
| 3,858,346 | 1/1975 | Bailey | 43/124 |
| 3,940,875 | 3/1976 | Basile | 43/124 |
| 4,240,802 | 12/1980 | Nichols | 43/129 |
| 4,382,077 | 5/1983 | Buchbinder | 424/40 |
| 4,768,306 | 9/1988 | Hilbun | 43/125 |
| 4,991,342 | 2/1991 | Maher et al. | 47/1.7 |

Primary Examiner—Richard K. Seidel
Assistant Examiner—James Miner
Attorney, Agent, or Firm—Sughrue, Mion, Zinn, Macpeak & Seas

[57] ABSTRACT

A method for killing fire ants in subterranean tunnels includes fogging the subterranean tunnels with an insecticidal amount of thermal aerosol fog through a boot covering the subterranean tunnels and then blowing hot air into the subterranean tunnels whereby the thermal aerosol fog is forced further into the subterranean tunnels. The apparatus used in the method includes a heat generator unit capable of producing thermal fog and a boot with skirt connected to said generator and which covers said subterranean tunnels. A dye may be added to the fog to provide a color marking for each fire ant mound treated by the fog.

19 Claims, 2 Drawing Sheets

METHOD AND APPARATUS FOR KILLING FIRE ANTS

RELATED APPLICATION

This application is a continuation-in-part of U.S. patent application No. 07/678,499, filed Apr. 2, 1991, now abandoned.

BACKGROUND OF THE INVENTION

The present invention relates to the treatment and control of fire ants. In particular, the present invention relates to an apparatus and method for killing fire ants.

Fire ants have become a serious problem in the southern United States, in particular Florida, Texas, South Carolina and Georgia, during the past ten years and the problem has now reached epidemic proportions. The fire ants, who live in colonies, build mounds. These mounds have various diameters and heights, which, in some cases, can reach up to two feet in height above the ground and up to three feet under ground, with a total diameter of up to two to three feet.

It has been recently confirmed that the colonies have more than one queen ant, and thus it has become crucial to kill all of the queen ants, otherwise the mound could be rebuilt easily and quickly after the effects of the chemical insecticide subside.

Several chemical insecticides/pesticides have been introduced for fire ant control, such as LUPSDAN, manufactured by Dow Chemical Company. However, due to application problems, the product has never successfully been applied on a wide scale. Other chemicals are available in granular form and require the granules be taken back by the fire ants to the mound where interference with reproduction occurs. These procedures can take as long as six months to evaluate the chemical's effectiveness on a specific mound during which time many new and additional mounds can be started and each of these can then reproduce.

In addition, farmers, the persons most adversely affected by fire ants, do not want to spend excessive amounts of money in controlling fire ants. There is demand for a method that is inexpensive, easily applied and effective with long term control being important.

U.S Pat. No. 3,633,825 describes a fogging apparatus which includes a prime mover driving a blower for supplying air under pressure to a nozzle assembly. Minute quantities of liquid such as concentrated pesticides are introduced into the axially directed discharging air and combined with the spirally directed discharging air to produce a fog.

U.S. Pat. No. 1,290,544 describes an ant killing machine which uses a portable device for distributing poisonous liquids or gases onto anthills and other places where insects and pests are conjugated in considerable numbers.

U.S. Pat. No. 1,245,685 describes an apparatus for applying a gaseous or liquid insecticide to the soil which permits the operator to observe the application of the insecticide and to confine the same to a particular area under treatment.

U.S. Pat. No. 1,926,579 describes a method of destroying insects with pyrethrum. The method and process described uses a simple spray device which contains pyrethrum concentrate.

U.S. Pat. No. 4,768,306 describes a method and device for killing fire ants in a mound which uses a shroud which will fit over the mound and conform to the contour of the ground. The shroud is provided with a relief valve, a tube or hose for admitting an exhaust gas into the shroud and a handle for lifting the device. The gas used in this method is exhaust gases from an automobile or such.

U.S. Pat. No. 4,833,818 describes a method for exterminating subterranean animals which uses a heavier-than-air gas such a $CO_2$. The heavier-than-air gas is injected into a cover member which overlies at least one tunnel.

U.S. Pat. No. 4,829,706 describes a pest extermination method and apparatus which uses a small light-weight internal combustion engine and a means for directing the engine exhaust into exterminating relationship to the pest such as a burrow or tunnel. The engine is mounted on an inverted bowl-shaped exhaust shroud which sits on the ground to direct engine exhaust into the underground rodent burrow.

U.S. Pat. No. 4,637,161 describes an apparatus for underground insect and animal extermination which uses a downwardly opening shield which is provided on a lower portion of a probe.

U.S. Pat. No. 4,640,044 describes a hood or cover used to eradicate fire ants which is translucent and uses a lens shape to intensify sunlight.

U.S. Pat. No. 4,756,118 describes a method and apparatus for the mechanical destruction of fire ants by introducing intense heat, vapor, insecticides, and/or steam directly into the colony by incorporating the use and application of specific compounds and mixtures of hydrocarbons, pyrethoids, insecticides, oxidation, oxidizing agents, and/or vaporizing liquids, which are injected into individual ant colonies by a variety of methods, including a pressurizing injection gun with a heating attachment.

U.S. Pat. No. 4,160,336 describes a method and apparatus for treating fire ants which combines an insecticide with a refrigerant into a mixture and injects the mixture into the fire ant hills.

U.S. Pat. No. 1,009,042 describes a method which provides an apparatus in which smoke or other vapors are generated and forced into the holes of burrowing pests.

U.S. Pat. No. 4,546,563 describes a method and apparatus for killing earth-burrowing insects which includes an elongated shell containing an explosive powder removeably mounted at one end of an elongated barrel by means of a holding mechanism.

U.S. Pat. No. 4,534,128 describes a method for treating pests and insects by combining an anesthetic and an insecticide into a mixture, and applying the mixture to the dwelling place of the insect or pest.

Finally, U.S. Pat. No. 4,815,234 describes an apparatus for destroying fire ants which includes a rotatable ant bed destruction member and apparatus for rotating such destruction member into an ant bed. A fluid delivery assembly is provided for delivering water or other fluids to the rotatable destruction member to drown and otherwise kill the ants.

The problem with the above methods and apparatus for killing fire ants is that when a colony is disturbed in any manner, such as a vibration or pressure change, the entire colony can be totally evacuated in less than one minute. At the time of the first vibration, the workers immediately lead the queens deep into the central reaches of the nest or out through the various lateral tunnels and thus to safety from most attempts to kill the queens. A single, surviving queen is capable of re-establishing a colony.

Another problem with previous application methods is inadequate penetration of the chemical pesticide or gases into the various deep passages of the mound and the adjoining subsoil through which ants can travel or into which ants can burrow.

Still another problem exists with respect to previous application methods. Since there may be several hundred mounds per acre, it is difficult to distinguish which mounds have been treated. Even if a single mound remains untreated, the first ants will continue to spread, thereby nullifying the treatment of the other mounds.

Accordingly, a need continues for a novel, effective and inexpensive apparatus and method for treating and killing fire ants.

SUMMARY OF THE INVENTION

Accordingly, it is an objective of the present invention to provide a method and apparatus for killing fire ants which is effective in killing all of the queen fire ants in one colony.

Another objective of the present invention is to provide a method and apparatus for killing fire ants which is inexpensive in terms of application costs.

A further object of the present invention is to provide an effective method and apparatus for killing fire ants which clearly identifies which mounds have been treated and which provides long-term results.

The above objectives are accomplished by the following method and apparatus.

An apparatus used for killing fire ants in subterranean tunnels comprising:
  (a) a thermal fog generating means for of producing thermal fog; and
  (b) a boot connected to said generator and which covers a ground surface area substantially coextensive with said subterranean tunnels.

A method for killing fire ants in subterranean tunnels comprising the following steps:
  (a) fogging the subterranean tunnels with an insecticidal amount of thermal aerosol fog through a boot covering a ground area substantially coextensive with the subterranean tunnels and then;
  (b) blowing hot air into the subterranean tunnels whereby the thermal aerosol fog is forced further into the subterranean tunnels.

A marking dye may be added to the thermal aerosol fog which will clearly identify a treated mound with a distinctive color.

DETAILED DESCRIPTION OF DESCRIPTION

Figure 1:
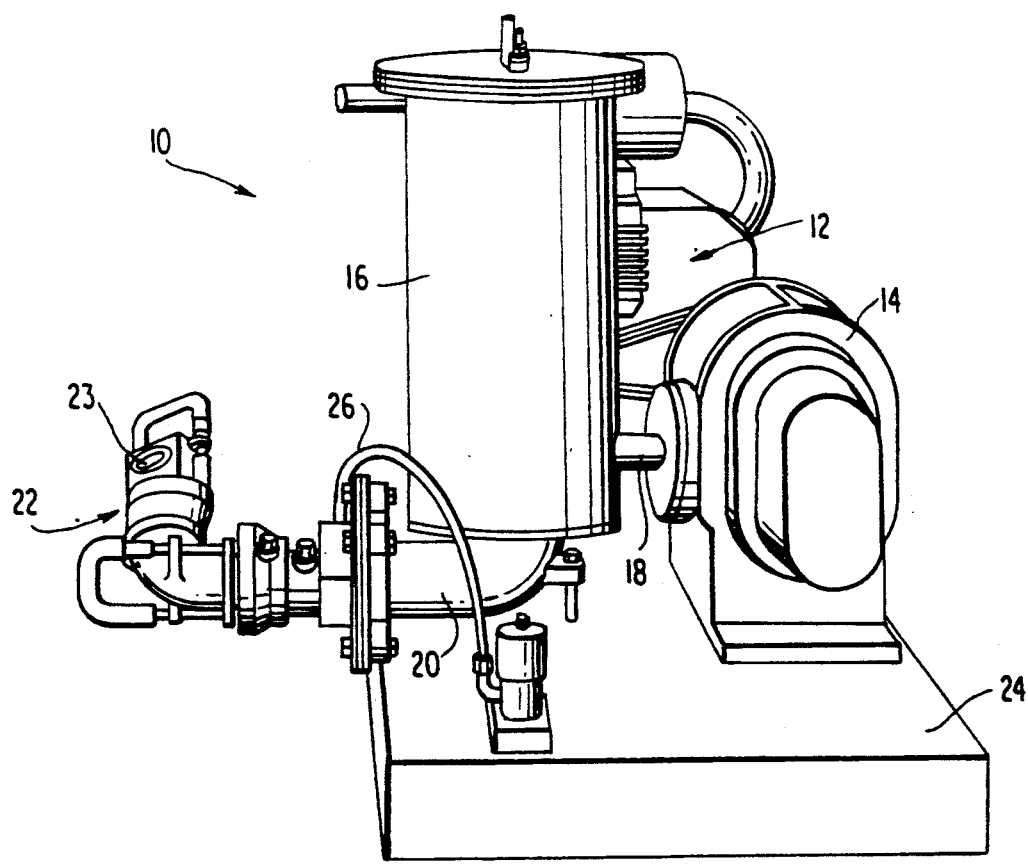
FIG. 1 is a perspective view of a conventional fogging apparatus.

The fogging apparatus that is used in the present invention is a heat generator unit capable of producing a thermal aerosol fog at rates of about 1 to 50 gallons per hour. An example of a suitable fogging apparatus is shown in FIG. 1 and is disclosed in detail in U.S. Pat. No. 4,606,721.

The hot fog generating machine which is illustrated in FIG. 1, is comprised of an internal combustion engine 12 which drive an air compressor 14. The compressed air from the air compressor 14 is supplied to the combustion chamber 16 by means of the connecting conduit 18. The compressed air and a suitable fuel, such as gasoline or a diesel fuel, are mixed within the combustion chamber 16 and the exhaust gasses are expelled under high pressure and velocity through the outlet conduit 20 to a fog generating nozzle 22. All of the aforementioned elements may be mounted on a self-contained portable platform 24. A suitable chemical, such as an insecticide or the like, may be supplied through a conduit 26 to the hot combustion gasses in the vicinity of the outlet conduit 20.

The efficiency of any chemical fog applicator lies in its ability to kill the maximum number of insects with the minimum amount of chemical formulation in the shortest practical time period. Research by leading laboratories has shown that proper chemical dosage and particle size of the thermal aerosol droplets are required for most effective insect control. The dosage is determined by the fogging rate in gallons per hour, the amount of insecticide mixed, if any, with each gallon of fog oil and the speed of the fogging vehicle. It is essential to control the size of the fog particle in a thermal aerosol fog to the desired size providing maximum kill for a specific species of insect. Particles that are too small are easily deflected and dissipate and do not impinge upon surfaces or insects. Particles that are too large settle rapidly and have poor or erratic dispersion patterns. By proper control of fogging particle size and proper fogging rate in gallons per hour output, excellent control of fire ants will be obtained.

A fog hose (see FIG. 2), is attached to the fogging head/discharge head 22 of the fogging apparatus with a head clamp 32. The head clamp 32 is comprised of a semi-circular bracket 34 having a semi-circular rod 36 pivoted thereto at one end and secured in a slot 38 at the opposite end by means of a nut 40 threaded on the end of the rod 36. A pair of curved support arms 42 and 44 are secured to opposite sides of the bracket 34 by means of welding or the like. The arms 42 and 44 are secured at their opposite ends to opposite sides of a split clamp 46 which is clamped to the end of the hose 30 by a strap 48 having threaded tightening means 50. The head clamp 32 keeps the mouth of the fog hose 30 at the required distance (approximately one to three inches) from the outlet aperture 23 of the fogging head 22 as shown in FIG. 2.

Figure 2:
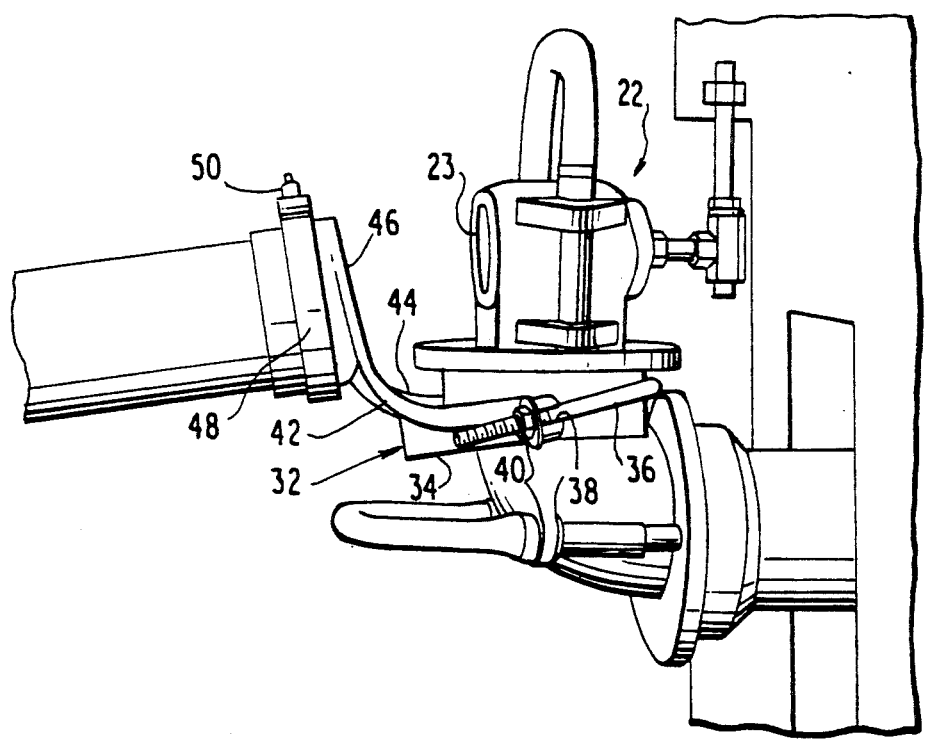
FIG. 2 is a perspective view of a fog hose attached in spaced relation to a fogging head/discharge head of the fogging apparatus.
Figure 3:
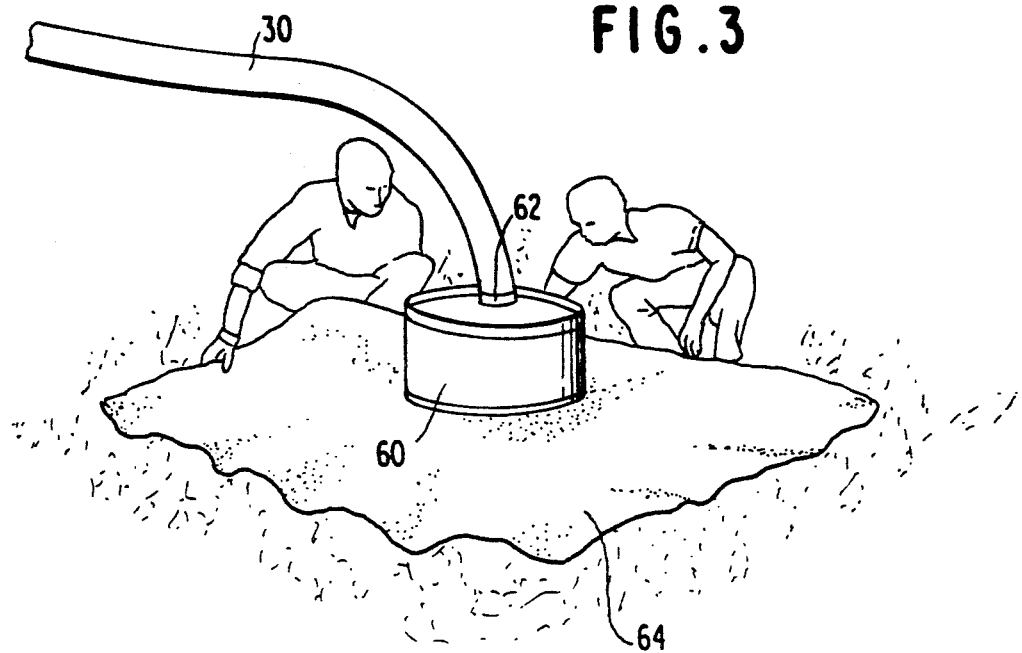
FIG. 3 is a perspective view of the boot connected to the fog hose with a skirt secured to the boot.

The opposite end of the fog hose 30 is attached to a specifically designed boot (FIG. 3) which is a cylinder device 60 which is open-ended at the bottom and has a small diameter opening on top surrounded by a collar 62 to which the opposite end of the fog hose 30 is attached an suitable clamping means such as the clamp 48 shown in FIG. 2.

The boot can be constructed of an material but preferably the boot is constructed of metal because the temperature inside the boot may reach up to 600° F. or higher. The boot is subject to rough usage under various field conditions and must be strong, firm and well built but light enough to be mobile. The height and diameter of the boot may vary depending upon the height and diameter of the ant mound. Generally, the boot will have a diameter of 2 to 3 feet and a height of 2 to 5 feet.

Preferably, attached to the boot is a skirt 64 which is securely fastened to the boot by any suitable means such as a clamp or elastic. The skirt is spread out to its fullest extent around the boot to provide further control of fog emitted from the boot and from surrounding ant passages which are not covered by the boot. The skirt may be of any suitable material but should preferably be air and moisture impermeable to prevent the passage of the fog therethrough.

The skirt can be constructed from any flexible material including natural or synthetic rubber or plastic and can be any size depending upon the additional ground area to be covered by the skirt or apron. The ground area covered by the skirt should be substantially coextensive with the subterranean network of passages.

As stated previously, an insecticide can be mixed with a petroleum base fog oil to comprise an insecticide mixture. A colorant may also be mixed with the oil to provide a colored smoke.

One insecticide that can be used comprises at least about 0.05% by weight pyrethrins (natural or synthetic), the remainder being insert ingredients. Examples of pyrethrins include, but are not limited to tetramethine, cinerin and resmerethrin.

The insecticide used can also be a combination of pyrethrin (natural or synthetic), rotenone, other cube resins and inert ingredients. For example, the pyrethrins can be used in combination with piperonyl butoxide synergist at from about 0.05% up to about 60% by weight and/or in combination with pure rotenone at from about 0.01% up to about 5% by weight, the remainder being insert ingredients. Preferably, 0.2–1.0% by weight of pyrethrins, 0.2–1.0% by weight of rotenone, 0.5–10%, by weight of piperonyl butoxide synergist and 0.2–1.0% by weight of other cube resins are used with inert ingredients completing the remaining balance of the insecticide.

The above insecticide in a petroleum base is commercially available and is known by the trade name, PYRELLIN E.C., manufactured by Webb Wright Corporation or PROTEX PLUS available from TIFA Limited.

Alternatively, PYRIXICIDE manufactured by TIFA, Ltd. can be used. PYRIXICIDE consists essentially of d-trans-chrysanthemum monocarboxylic acid ester of d-2-allyl-4-hydroxy-3-methyl, piperonyl butoxide, N-octyl bicycloheptene dicarboximide and inert ingredients in a petroleum base.

Preferably, 0.2–0.6% by weight of d-trans-chrysanthemum monocarboxylic acid ester of d-2-allyl-4-hydroxy-3-methyl, 0.5–1.0% by weight of piperonyl butoxide, and 1.0 to 1.5% by weight of N-octyl bicycloheptene dicarboximide with inert ingredients completing the remaining balance of the insecticide.

One or more of the insecticides described above can be mixed/diluted with a petroleum base fog oil such as diesel or fuel oil to comprise an insecticide mixture to be used in the fogging apparatus.

Typical examples of the petroleum base fog oil are diesel or fuel oil including No. 1 or No. 2 fuel oil, kerosene, and mineral seal oil.

Preferably, dilution rates of from about 1:5 (insecticide:diesel or fuel oil) parts by volume to about 1:10 parts by volume are used. That is, about 1 part insecticide to about 5 to 10 parts diesel or fuel oil.

The colorant used to provide colorded smoke would be dry colored dyes in a solubilized base at a dosage of 20% dry weight of dye dissolvbed into a methylated napthalene base. The blended color liquid is mixed one part liquid dye of two parts of diesel or gas oil, or mineral seal oil and then dispersed. Continual agitation and recirculation are required.

The colorants are completely soluble in fuel or mineral seal oil or kerosene. The preferable oil to use would be mineral seal oil because it is biodegradable, there is less residue that may be harmful to the environment and a small quantity of oil products will produce a denser fog than larger quantities of lighter weight oil such as kerosene or diesel oil.

Examples of suitable different color dyes which are soluble in oil or solvent are:

| | | |
|---|---|---|
| LX 6258 | PYLAKROME | BRIGHT BLUE |
| LX 1913A | PYLAKROME | YELLOW |
| LX 1903 | PYLAKROME | RED |

These dyes are commercially available from Pylan Products Company, Inc. of Garden City, N.Y.

By mixing the dye and the insecticide together with the oil, the fog produced will carry the dye and the insecticide through the tunnels in the fire ant mount and also deposit dye on the outer surface of the mound to provide a readily visible indicator that the mound has been treated. The colored fog will eventually exit from passages extending laterally outwardly of the mound to provide an indication as to the lateral extent of the colony.

Based on the fogging apparatus settings set forth in the Table, a flowmeter setting (particle size selector) may be chosen from 1–18, with 1 to 10 being preferred and 2 to 8 being most preferred.

In other words, the fogging apparatus should produce a flow rate of from about 1 to 45 liters/hr, a spectrum of droplet size of from about 1 to 10 μm to about 45 to 60 μm, and a volume mean diameter (V.M.D.) of from about 5 microns to about 60 microns.

The Table below illustrates the flow rate, spectrum of droplet size and volume mean diameter represented by the various flowmeter settings.

TABLE

Discharge Performance: Flow Rates and some Droplet Sizes Volume Mean Diameter (V.M.D) (in Microns) at Different Particle Size Selector Value

| Flowmeter Settings | Flow Rate (liters/hr) | Flow Rate (Gal./Hr.) | Spectrum of Droplet size (μm) | Volume Mean Diameter (V.M.D.) |
|---|---|---|---|---|
| 1 | 1 | 0.26 | 1 to 10 | 5 microns |
| 2 | 2.9 | 0.50 | 2 to 15 | 7.5 microns |
| 3 | 4.8 | 1.27 | 5 to 20 | 10 microns |
| 4 | 7.85 | 2.07 | 7 to 23 | 13 microns |
| 5 | 10.91 | 2.88 | 10 to 25 | 15 microns |
| 6 | 14.69 | 3.88 | 13 to 30 | 17 microns |
| 7 | 18.46 | 4.88 | 15 to 35 | 20 microns |
| 8 | 19.23 | 5.08 | 17 to 37 | 23 microns |
| 9 | 20.00 | 5.28 | 20 to 40 | 25 microns |
| 10 | 22.00 | 5.81 | 23 to 43 | 27 microns |
| 11 | 24.00 | 6.34 | 25 to 45 | 30 microns |
| 12 | 25.50 | 6.74 | 27 to 47 | 33 microns |
| 13 | 27.00 | 7.13 | 30 to 55 | 35 microns |
| 14 | 28.50 | 7.53 | 33 to 57 | 37 microns |
| 15 | 30.00 | 7.93 | 35 to 60 | 40 microns |
| 16 | 35.00 | 9.25 | 37 to 60 | 45 microns |
| 17 | 40.00 | 10.57 | 40 to 60 | 50 microns |
| 18 | 45.00 | 12.62 | 45 to 60 | 60 microns |

Percentage efficiency at each particle size setting is 99%
RPM = 2600 Pressure = 40 PSI Test Liquid: Deodorized Kerosene Once the entire apparatus is set-up, the machine should be run for three (3) minutes to preheat the fog hose. After the fog hose is preheated for three (3) minutes, the boot and skirt which are attached to the remote end of the hose are placed over the fire ant mound. A fog with the insecticide mixture is then supplied through the hose and boot into the fire ant mound.

The time or period of application can vary from mound to mound depending upon the size of the mound, type of soil, and other soil conditions. Preferably, the time of application is from about 1 to 10 seconds, more preferably about 2 to about 3 seconds.

Once the application of the insecticide mixture in the form of fog is completed, the inventors have discovered that the blower from the fogging apparatus should continue to run for an additional period of time, forcing hot air and/or insecticide mixture into the ant passages and thus allowing the insecticide mixture to penetrate further into the passages of the mound and preventing the dispersal of ants or queens to safer distant areas. Preferably, this period should be from about 1 to about 20 seconds, more preferably about 3 to about 10 seconds.

The hot air is generally from about 500° F. to about 2,200° F.

After blowing hot air and/or insecticide mixture into the boot for the additional period of time, the boot should be removed. If the treatment is performed properly there should be no visible sign of ant life in and around the mound. The mound should not be dug open for at least approximately 30 minutes after completing the fogging treatment in order to permit the fog insecticide mixture to penetrate into all of the remote areas of the mound as well as to permit the insecticide mixture to be deposited in all of the channels and corridors. After fog treatment, sometimes queen ants may be seen trying to leave the mound but will appear visibly affected and die shortly thereafter. Retreat mounds in the same fashion as described above as required. When a mound is re-treated, a different color dye may be used as a marker. Verification of complete kill of the mound should be made within one week after initial treatment to be sure that the population has not reoccurred and the mound is completely dead. If any sign of life is present upon inspection, re-treat the mound using the same method as before.

In special situations where environmental reasons prevent the use of an insecticide, the application of thermal fog alone (i.e., using fog oil alone) into the fire ant mounds is used. While this type of application is not as effective, this type of application will provide short term relief to an infested area. In particular, the application of a thermal fog alone will dry out the fire ant mound, desiccate the contents and cause the ants to dehydrate. The fog could also be colored for marking purposes.

Generally, the thermal fog alone should be applied from about 1 to about 30 seconds, after heating the fog hose as described above. Verification of effectiveness of the treatment and performance of the re-treatment is accomplished as described for use of the insecticide mixture.

The operator of the fogging unit should wear a complete face respirator type mask with separate breathing cartridges during treatments during ant control programs. All personnel should wear rubber boots to make sure that if they step into any ant mounds there is no danger of receiving extensive ant bits.

The invention will now be further described by the examples set forth below.

EXAMPLE

One gallon of Pyrellin E.C. (or Protex-Plus) was mixed with 5 gallons of diesel oil to form a mixture 1:5 by volume dilution rate. The mixture was placed in a drum wherein the mixture was pumped through the fogging apparatus. The fogging apparatus used was a TIFA 100-E (insecticidal fog applicator).

In some ranches in Florida, the method of the present invention was used, wherein a mound was covered by the TIFA Boot, and the fog hose was connected to the boot and the other end was connected to the fogging apparatus by the means described supra. The flowmeter setting was set at No. 6, and the time period of application was 2-3 seconds. Then, hot air at 1,200° F. was applied afterwards for a period of about 2-3 seconds as described supra. Ten mounds were treated in this fashion. Afterwards, the mounds were inspected after 5 minutes, wherein it was discovered that thousands of ants had been exterminated and no live ants could be found or seen. The mound was dug up 1 week later to determine the extermination results. No ant activity was uncovered thus indicating the effectiveness of the method of the present invention.

While one preferred embodiment of the present invention has been shown and described, it is to be understood that the present invention is capable of numerous modifications and rearrangements without departing from the spirit of the invention as set forth in the appended claims.

I claim:

1. A method for killing fire ants in subterranean tunnels comprising the following steps:
    (a) fogging the subterranean tunnels with an insecticidal amount of thermal aerosol fog through a boot covering the subterranean tunnels and then;
    (b) blowing only hot air into the subterranean tunnels whereby the thermal aerosol fog is forced further into the subterranean tunnels.

2. The method for killing fire ants of claim 1, wherein said thermal aerosol fog compresses an insecticide mixture.

3. The method for killing fire ants of claim 2, wherein said insecticide mixture comprises insecticide and fuel oil or kerosene.

4. The method for killing fire ants of claim 3, wherein said insecticide consists essentially of pyrethrum, rotenone, cube resins and inert ingredients.

5. The method for killing fire ants of claim 4, wherein said insecticide consists essentially of:
    0.2–1.0% by weight pyrethrins
    0.2–1.0% by weight rotenone
    0.5–1.0% by weight piperonyl butoxide synergist
    0.2–1.0% by weight other cube resins
    87%–98.9% by weight inert ingredients.

6. The method for killing fire ants of claim 3, wherein said mixture is about 1 part by volume insecticide to about 10 parts by volume fuel oil or kerosene.

7. The method for killing fire ants of claim 3, wherein said mixture is about 1 part by volume insecticide to about 5 parts by volume fuel oil or kerosene.

8. The method for killing fire ants of claim 1, wherein said fogging step is from about 1 to about 10 seconds.

9. The method for killing fire ants of claim 8, wherein said fogging step is from about 3 to about 5 seconds.

10. The method for killing fire ants of claim 1, wherein said blowing step is from about 1 to about 20 seconds.

11. The method for killing fire ants of claim 10, wherein said blowing step is from about 3 to about 10 seconds.

12. The method for killing fire ants of claim 1, wherein said fog has a particle size of from 1 to 35 μm units.

13. The method for killing fire ants of claim 12, wherein said fog has a spectrum droplet size of from about 1 to 10 μm to about 40 to 60 μm.

14. A method for killing fire ants in subterranean tunnels comprising the following steps:
   (a) fogging the subterranean tunnels with an insecticidal amount of thermal aerosol fog through a boot having a skirt connected thereto with said boot and skirt covering a ground area substantially co-extensive with said tunnels.
   (b) subsequently blowing only hot air into the subterranean tunnels whereby the thermal aerosol fog is forced further into the subterranean tunnels.

15. A method for killing fire ants in subterranean tunnels comprising:
   generating a thermal aerosol fog containing a color dye;
   injecting the fog into said tunnels through a boot substantially covering a ground area above said tunnels; and
   marking said ground area with said dye.

16. A method as set forth in claim 15, further comprising adding an insecticide to said fog.

17. A method as set forth in claim 16, further comprising connecting a skirt to said boot for covering a ground area substantially co-extensive with said tunnels.

18. A method as set forth in claim 15, further comprising connecting a skirt to said boot for covering a ground area substantially co-extensive with said tunnels.

19. An apparatus used for killing fire ants in subterranean tunnels comprising:
   (a) a heat generator unit capable of producing thermal fog;
   (b) a boot connected at one end to said generator and having a cylindrical portion at the other end which covers a portion of said subterranean tunnels; and
   (c) a skirt connected to said cylindrical portion of said boot and extending outwardly circumferentially of said boot to cover a ground area substantially co-extensive with said subterranean tunnels.

* * * * *